Dec. 17, 1935.                C. I. JUSTHEIM                2,024,454
                              COOKING UTENSIL
                            Filed May 15, 1934
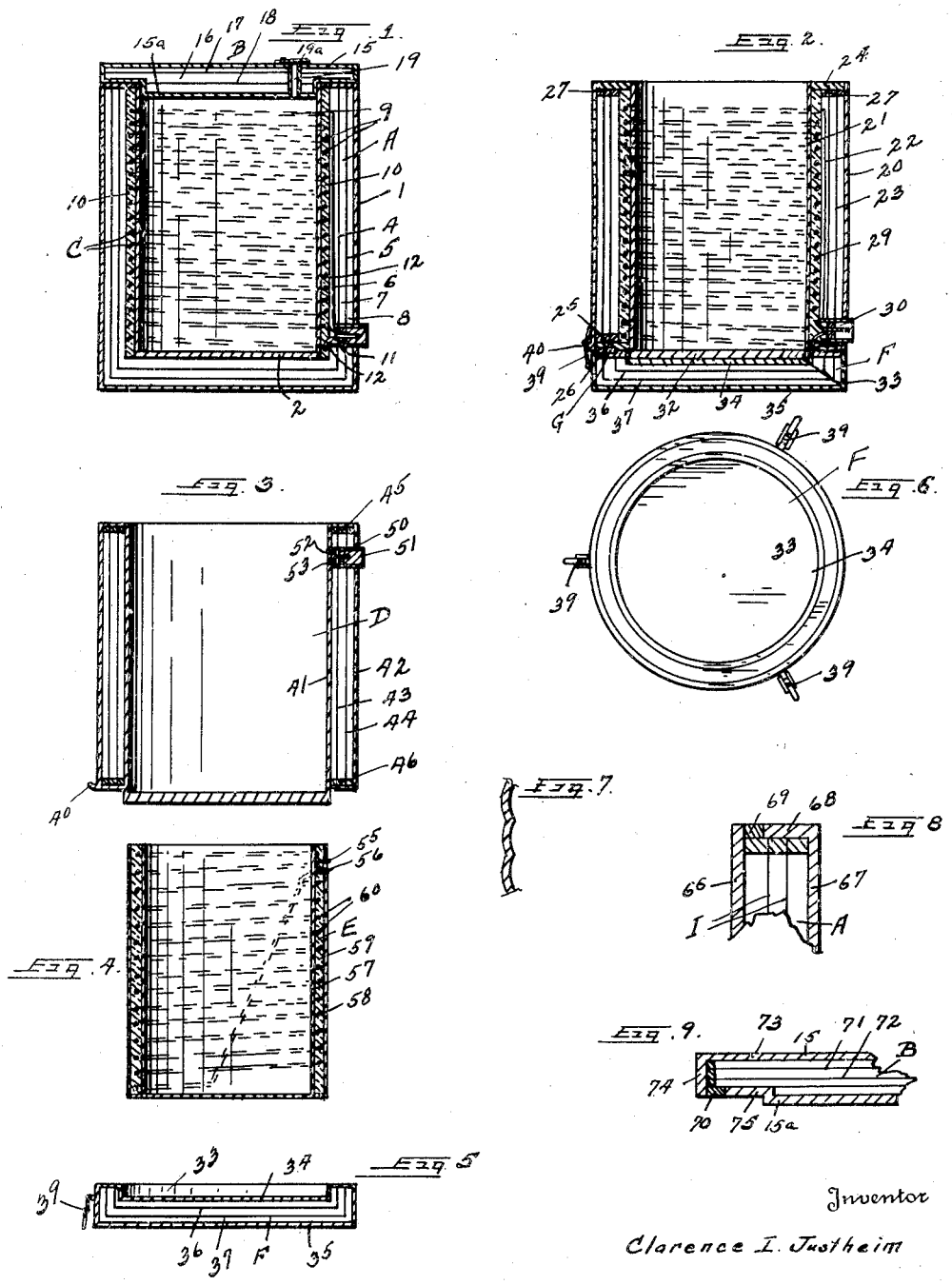
Inventor
Clarence I. Justheim
By R. M. Thomas
Attorney Patented Dec. 17, 1935

2,024,454

UNITED STATES PATENT OFFICE 2,024,454

COOKING UTENSIL

Clarence I. Justheim, Salt Lake City, Utah

Application May 15, 1934, Serial No. 725,758

9 Claims. (Cl. 219—44)

My invention relates to cooking utensils and has for its object to provide a new and efficient electric or stove heated cooker which will be insulated to hold the heat therein and maintain the highest efficiency possible per unit of heat consumed.

A further object is to provide a cooking utensil which will be insulated with sheets of spaced apart aluminum foil set apart by dead air spaces and which will be more efficient than the fiber insulation commonly used in such cookers to-day.

A still further object is to provide a utility cooking utensil which may be used with electricity, or which may be used on any type of stove should the electricity not be available.

A still further object is to provide a device which may be used to cook food therein and which may then be used to keep the food hot for a long period of time.

A still further object is to provide a device in which food may be cooked and which has a removable base which is removed for cooking on ordinary, gas, or electric stoves and which is then placed on the utensil when the cooking is finished, the base to insulate the bottom of the utensil to keep the food hot for a long period of time after the cooking is finished.

These objects I accomplish with the device illustrated in the accompanying drawing in which similar numerals and letters of reference indicate like parts throughout the several views and as described in the specification forming a part of this application and pointed out in the appended claims.

In the drawing in which I have shown my device,

Figure 1 is a vertical section of the device.

Figure 2 is a vertical section of a modification of the device.

Figure 3 is a vertical section of a cooking utensil in which the electrical cooking coil is removed therefrom to use the device for cooking on gas or types of heat other than electricity.

Figure 4 is a vertical section of the cooking electrical coil.

Figure 5 is a vertical section of the removable base.

Figure 6 is a plan view of Figure 5.

Figure 7 is a sectional view of the insulation medium showing the aluminum sheets with concave and convex facets therein.

Figure 8 is an enlarged view of the joint between the inner wall and the outer wall showing insulation between the two walls to prevent the carrying of heat thereacross.

Figure 9 is an enlarged view of the joint between the top and bottom wall of a cover showing a special construction therefor.

In the drawing I have shown the preferred model of the device Figure 1 as a cylindrical casing A, having a cover B therefor. The casing A consists of an outer shell 1 cylindrical in form with the bottom closed and an inner shell 2 of like form but of smaller diameter to fit down into and concentric with the outer shell 1 and the shell 2 is provided with a flange around the top edge which is secured to the top edge of the shell 1 in an air tight seal. The two shells 1 and 2 are spaced apart by dead air space and within this space I mount cylindrical members of very thin aluminum foil 4 and 5, shaped similar to the shells 1 and 2, spaced apart from the shells and each other by dead air spaces 6, 7, and 8. These members 4 and 5 are highly polished and the reflecting surfaces thereof retain the heat within the cooking vessel and hold the colder atmospheric air from affecting the heat of the device. Concentric with and surrounding the inner shell 2, I form a heating coil C, said coil being provided with insulation material 10 therearound to insulate the wires 9 of the coil from the inner shell 2 and from the foil 5. A socket 11 is formed in the side of the shell 1 and wires 12 connect the two ends of the coil wire 9 with the contact posts of the socket 11. This coil C may be made in many different styles to cover different conditions and may be made with different heating elements so that two or more heats may be effected within the cooking space such as high and low heat. Other types of heating units may be used, the main essential being that electrical heating coils are provided in the device surrounding the walls of the cooking shell 2, but being insulated therefrom.

The cover B for the device is made of an outer shell 15 forming a dead air space 16 therein in which dead air space suitable sheets of aluminum foil 17 and 18 are carried to properly insulate the cover to retain the heat in the cooking vessel.

A steam vent or port 19 is provided therethrough the entire cover to allow for escapement of steam therefrom to prevent the cover from being blown off or the vessel ruined. A pivoted valve plate 19a controls the opening of the vent 19. The bottom side 15a of the cover B is formed with a step to fit down into the interior of the extreme upper end of the inner shell 2.

In Figure 2 the cooking vessel is built to provide a utensil which may be heated for cooking either electrically or by gas, coal stove or other like means. This type of utensil is made with a cylindrical shell 20, spaced from a similarly shaped inner shell 21 by a dead air space, and within this dead air space there are concentric sheets of aluminum foil 22 and 23. The two shells are held spaced apart at the top by an annular flange or ring 24 and at the bottom by a like ring of flange 25 with the foil suitably mounted in blocks 26 and 27. The heating coil 29 is formed around and insulated from the inner shall 21 to heat the shell and a suitable socket 30 is provided to connect a cord thereto to supply the electrical energy therefor. The bottom 32 of the inner shell 21 is formed thicker than the sides thereof and is adapted to be placed on a stove to heat the device should electricity not be available. A removable base F is provided, said base being formed of an inner wall 34 and an outer wall 35 spaced apart by dead air spaces and carrying spaced apart aluminum foils 36 and 37 therein to insulate the base. This base is provided with a depression 33 in the top side thereof to fit over the thicker portion of the bottom 32 of the inner shell 21. Toggle clasps 39 are provided on the base F to engage over lugs 40 on the outer shell 20 to lock the base to the shell after cooking is completed or the base may be secured onto the vessel when the electrical coil is being used.

In Figure 3 I have shown the cooking vessel or utensil as a cylindrical vessel D having the walls thereof made of an inner shell 41 and an outer shell 42 with sheets of aluminum foil 43 and 44 mounted therebetween on suitable spacer rings 45 and 46. A socket 50 is formed in one side of the vessel D having contact blocks therein suitable for electrical use when desired. An insulated plug 51 is provided to close the socket when the electrical unit of the device is not being used and the contact blocks 52 and 53 of the plug are carried through the shells in slight depressions on the inner side of the inner shell 41 to receive spring held contact lugs 55 and 56 of the electrical unit E. This unit is to be passed or lowered into the inner shell 41 when it is desired to use electricity for cooking, and the inner wall of the unit then becomes the cooking space. This unit E is made with a cylindrical inner wall 57 and an outer wall 58 separated by the insulation 59 with the electrical unit 60 carried suspended in the insulation and the bottom closed to form the cooking chamber. The ends of the coil unit 60 connect with the spring held contact plugs 55 and 56 and said spring held plugs are adapted to seat in and contact with the contact blocks 52 and 53 of the socket 50 when the unit is in the vessel D.

In Figure 7 I have shown a section of a portion of the aluminum foil showing the concave facets on one side thereof and convex facets on the other side. These facets are so formed in the foil to provide better insulation by reflecting the heat rays concentrating then inwardly and diffusing the colder rays from the atmosphere outwardly.

In Figure 8 I have shown a section of the joint between the outer shell 66 and the inner shell 67 in which strip of insulation 69 is inserted between the edge of the face of the shell 66 and the flange 68 which flange is formed on the shell 67. The insulation is shown herein as I and is set in suitable spacer blocks between the two shells 66 and 67.

In Figure 9 an enlarged section of the cover is shown to show the shell 15 broken by an annular strip of insulation 70 with the insulation shown as 71 and 72. The top of the cover B is here shown as 73 with a depending flange 74 secured to the insulation strip 70 and the bottom 75 of the cover secured to the strip 70 with the step 15a in the bottom 75 to fit into the cooking inner shell.

As shown in Figure 2 there may be suitable insulation rings G between the casing and the base to prevent escapement of heat from therebetween, or the transmission of heat through the juncture of the casing to the base may also be prevented in a manner similar to that shown in Figures 8 and 9, for the construction of the top of the base and also for the bottom of the casing adjacent the juncture of the base to the casing.

Having thus described my invention I desire to secure by Letters Patent and claim:

1. In a cooking vessel of the class described, the combination of a cylindrical shell with a closed bottom; a like shell of smaller diameter carried in said first shell and carrying sheets of highly polished aluminum foil therebetween; means to support the foil, with dead air spaces separating each sheet of foil from each other and from the two shells; a heating coil mounted around the smaller diametered shell; means to insulate the coil from the shell; and means to introduce electrical energy into said coil to heat the interior of the vessel.

2. In a cooking utensil, the combination of spaced apart inner and outer shell carrying, spaced apart aluminum foil therebetween; an electrical heating coil mounted surrounding the inner shell to heat the interior of the utensil; and means to introduce electrical energy into the coil.

3. In a cooking utensil, the combination of an inner and an outer shell spaced from each other with the bottom of the inner shell forming the base of the two shells; sheets of aluminum foil mounted between the two shells spaced apart by dead air spaces; a removable base for said utensil formed of an inner and outer shell spaced apart and carrying sheets of aluminum foil therebetween; and means to secure the removable base onto the bottom of the utensil.

4. In a cooking utensil, the combination of a cooking vessel comprising two shells spaced apart with the bottom of the inner shell made thicker and forming the base of the two shells to engage a heating surface; annular spacer rings to form the bottom and top ends between the two shells with the shells and ends sealed together; heat insulation carried in the space between the two shells; and an insulated removable base for said vessel to be secured onto the bottom thereof.

5. In a cooking utensil, the combination of an inner and an outer shell sealed together with suitable heat insulation carried therebetween and with the inner shell having the base thereof thicker to form a heating surface; a removable base formed of inner and outer shell spaced apart by insulation; and an electrical heating coil carried in the walls of a removable inner vessel, said inner vessel to be used when heating by electricity.

6. In a cooking utensil, the combination of an inner and an outer shell spaced apart; sheets of aluminum foil mounted therebetween; means to insulate the juncture of the inner shell to the outer shell to prevent escapement of heat;

a cover for said utensil of like construction; and means to heat said inner shell either with electrical coils or other heating mediums.

7. In a cooking utensil, the combination of an inner and an outer shell spaced apart; sheets of aluminum foil mounted therebetween for insulation; means to insulate the joint of the inner wall to the outer wall; an electrical coil surrounding the inner shell; means to insulate said coil; and a cover for said utensil formed of like construction to that of the shell.

8. In a cooking utensil, the combination of an inner shell forming a cooking chamber and an outer shell spaced therefrom; heat insulation in the space between the two shells; means to heat the inner shell to cook the material therein; a detachable base for said utensil formed of an inner and outer shell spaced apart and carrying insulation in the space between the shells; means to secure the base onto the utensil after the cooking has taken place to retain all the heat therein; and a cover for said utensil formed of an inner and outer shell spaced apart and carrying insulation in the space between the shells.

9. In a cooking utensil, the combination of an inner and an outer shell spaced from each other with the bottom of the inner shell made thicker forming the base of the two shells; sheets of aluminum foil mounted between the two shells spaced apart by dead air spaces; a removable base for said utensil formed of an inner and outer shell spaced apart and carrying sheets of aluminum foil therebetween; and means to secure the removable base onto the bottom of the utensil.

CLARENCE I. JUSTHEIM.